(12) United States Patent
Baird et al.

(10) Patent No.: US 7,475,242 B2
(45) Date of Patent: Jan. 6, 2009

(54) CONTROLLING THE DISTRIBUTION OF INFORMATION

(75) Inventors: Roger T. Baird, Boise, ID (US); Jeffrey C. Baird, Meridian, ID (US); Timothy P. Blair, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1576 days.

(21) Appl. No.: 10/024,964

(22) Filed: Dec. 18, 2001

(65) Prior Publication Data

US 2003/0115481 A1 Jun. 19, 2003

(51) Int. Cl.
G06F 7/04 (2006.01)
G06F 17/30 (2006.01)
H04L 9/32 (2006.01)
H04N 7/167 (2006.01)
H04L 9/00 (2006.01)
G06F 3/00 (2006.01)

(52) U.S. Cl. .............................. 713/166; 726/4; 726/28; 715/233; 715/741

(58) Field of Classification Search .................. 713/154, 713/165, 166; 707/9; 726/28, 4; 715/233, 715/741
See application file for complete search history.

(56) References Cited

U.S. PATENT DOCUMENTS

| | | | | | |
|---|---|---|---|---|---|
| 5,195,135 | A | * | 3/1993 | Palmer | 380/241 |
| 5,581,682 | A | * | 12/1996 | Anderson et al. | 715/236 |
| 5,701,342 | A | * | 12/1997 | Anderson et al. | 713/176 |
| 5,832,212 | A | * | 11/1998 | Cragun et al. | 726/2 |
| 5,903,646 | A | * | 5/1999 | Rackman | 705/51 |
| 5,933,498 | A | * | 8/1999 | Schneck et al. | 705/54 |
| 5,960,080 | A | * | 9/1999 | Fahlman et al. | 380/252 |
| 5,996,011 | A | * | 11/1999 | Humes | 709/225 |
| 6,070,185 | A | * | 5/2000 | Anupam et al. | 709/204 |
| 6,078,907 | A | * | 6/2000 | Lamm | 705/40 |
| 6,253,203 | B1 | * | 6/2001 | O'Flaherty et al. | 707/9 |
| 6,442,607 | B1 | * | 8/2002 | Korn et al. | 709/225 |
| 6,598,161 | B1 | * | 7/2003 | Kluttz et al. | 713/166 |
| 6,820,082 | B1 | * | 11/2004 | Cook et al. | 707/9 |
| 6,889,205 | B1 | * | 5/2005 | Lamm | 705/40 |
| 6,892,201 | B2 | * | 5/2005 | Brown et al. | 707/9 |
| 7,024,699 | B1 | * | 4/2006 | Delaney | 726/27 |
| 7,103,915 | B2 | * | 9/2006 | Redlich et al. | 726/27 |
| 7,293,175 | B2 | * | 11/2007 | Brown et al. | 713/166 |
| 2001/0021926 | A1 | * | 9/2001 | Schneck et al. | 705/54 |
| 2002/0091734 | A1 | * | 7/2002 | Redlich et al. | 707/511 |
| 2002/0147782 | A1 | * | 10/2002 | Dimitrova et al. | 709/207 |
| 2004/0250272 | A1 | * | 12/2004 | Durden et al. | 725/25 |

OTHER PUBLICATIONS

Venkatraman, Dheera. "Why blurring sensitive information is a bad idea", 2007, retrieved from <http://dheera.net/projects/blur.php> Sep. 4, 2008.*

* cited by examiner

*Primary Examiner*—Kambiz Zand
*Assistant Examiner*—Michael J Simitoski

(57) ABSTRACT

A source generates a request to receive a document. A determination is made regarding an authorization level associated with the source of the request. Another determination is made as to an authorization level required to view the requested document. If the source of the request is authorized to receive the requested document, the requested document is transmitted to the source of the request. If the source of the request is not authorized to receive the requested document, the unauthorized portions of the requested document are redacted and the redacted version of the requested document is transmitted to the source of the request.

11 Claims, 5 Drawing Sheets

CONTROLLING THE DISTRIBUTION OF INFORMATION

TECHNICAL FIELD

The present invention relates to methods and systems that authorize the distribution and/or display of information based on the authorization privileges of the user or system requesting the information.

BACKGROUND

Documents and other collections of information are routinely downloaded from servers and displayed (or presented) on client computer systems. These documents may contain confidential information or other information that is only made available to authorized individuals or authorized systems. For example, a document may contain confidential salary information that is restricted to viewing by company managers or other individuals that require access to such information. The salary information should not be displayed to other individuals.

Similarly, a particular document may contain information that is appropriate for adults, but inappropriate for children. In this situation, children should not be permitted to view the information that is inappropriate for them. In another example, individuals may be required to pay a fee to view certain portions of a document or to view an entire document. In this example, only those individuals that have paid the appropriate fee should be permitted to view the entire document (i.e., the "free" portions of the document as well as the portions for which a fee was paid).

Existing systems typically block access to an entire document if a particular individual is not permitted to view a particular portion of the document. Thus, if a particular document contains confidential information, such as salary information, that an individual is not permitted to view, the individual is prevented from viewing any portion of the document, including those portions that do not contain confidential information. In this situation, it is not necessary to restrict access to information that is not confidential. If the document contains other information that is useful to the individual, they are prevented from viewing that information because a small portion of the document contains confidential information.

The invention described herein addresses these problems by allowing a portion of a document to be redacted without preventing access to other portions of the document.

SUMMARY

The systems and methods described herein authorize the distribution of documents and/or the display of documents based on the access privileges of the requesting user or system. Portions of a particular document may be redacted or deleted depending on the access privileges of the user or system. Although a portion of the document is redacted, the remainder of the document can be viewed by the user of the system. The redacted portion of the document may be visually blurred such that the general appearance of the redacted portion remains visible, but the details of the redacted portion are not visible. Alternatively, the redacted portion of the document is deleted (e.g., by replacing the redacted portion with a solid black or solid white image).

In a particular embodiment, a request for a document is received from a source. A determination is made regarding an authorization level associated with the source of the request. Another determination is made regarding an authorization level required to view the requested document. If the source of the request is authorized to receive the requested document, the requested document is transmitted to the source of the request. If the source of the request is not authorized to receive the requested document, the unauthorized portions of the document are redacted and the redacted version of the requested document is transmitted to the source of the request.

In a described embodiment, the redacting of unauthorized portions of the requested document includes deleting the unauthorized portions of the requested document.

In another embodiment, the redacting of unauthorized portions of the requested document includes visually blurring the unauthorized portions of the requested document.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The systems and methods described herein authorize the distribution and display of documents based on the access privileges of a requesting user or system. If a user or system is not authorized to view certain portions of a document, those portions are redacted prior to communicating or displaying the document to the system or user. Thus, different users may be permitted to view different portions of the same document, depending on the access privileges of each user. In certain situations, the redacted portions of the document may be partially visible to encourage the user to pay a fee or otherwise gain permission to access the redacted portions.

Figure 1:
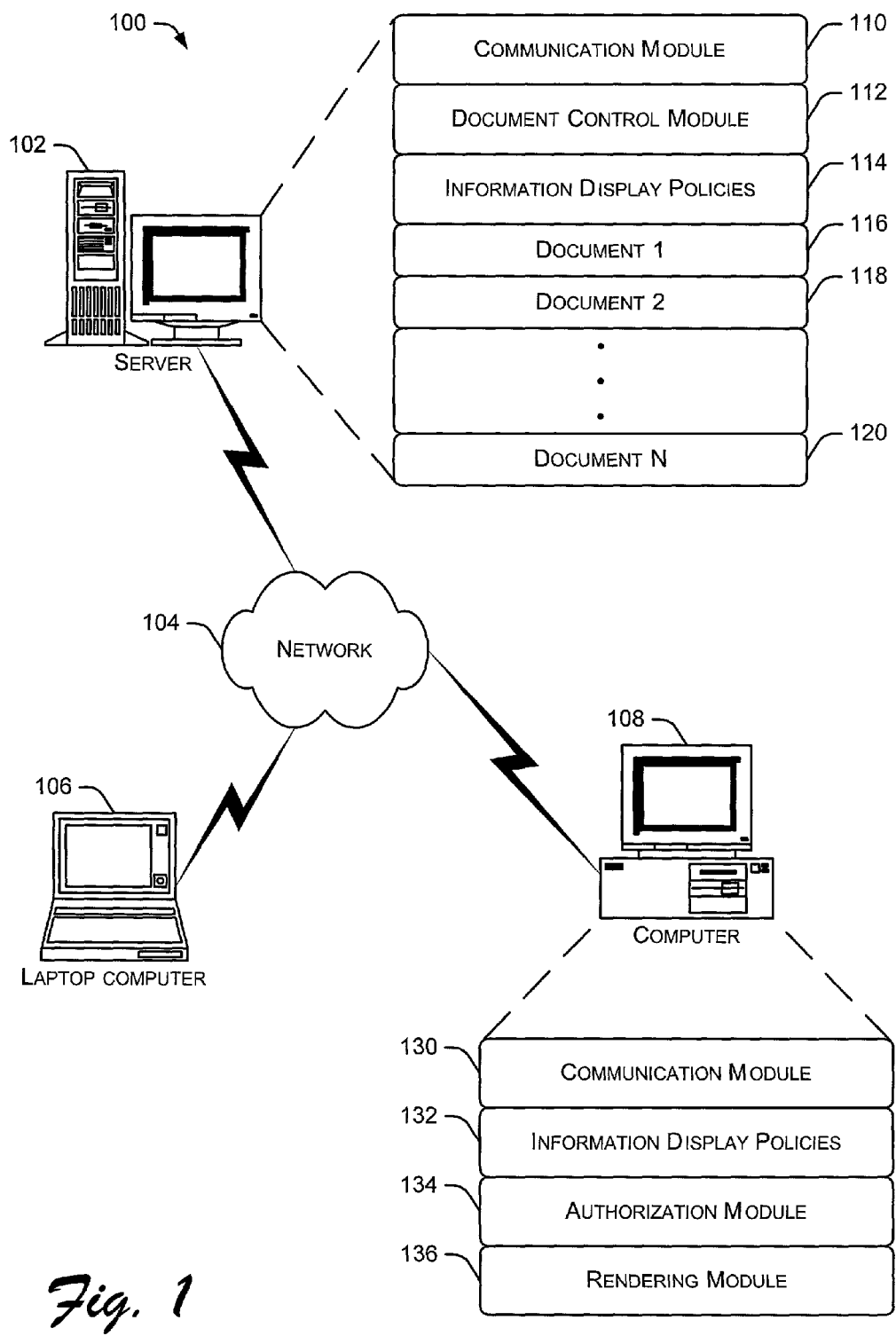
FIG. 1 illustrates an exemplary environment in which the methods and systems described herein may be implemented.

FIG. 1 illustrates an exemplary environment 100 in which the methods and systems described herein may be implemented. Network environment 100 includes a server 102, a network 104, and client computers 106 and 108. Server 102 contains various documents, application programs, and data, as discussed below. Network 104 may be any type of data communication network utilizing any network topology and any network communication protocol. For example, network 104 may be a local area network (LAN), a wide area network (WAN), or the Internet. Additionally, network 104 may be a combination of two or more different networks.

Client computers 106 and 108 are also coupled to network 104. Client computers 106 and 108 communicate with server 102 and with one another via network 104. Although client computer 106 is illustrated as a laptop computer and client computer 108 is illustrated as a desktop computer, client computers 106 and 108 can be any type of computing device, including a palmtop computer, a personal digital assistant (PDA), a cellular phone, a set top box, or other device. Although a single server 102 and two client computers 106 and 108 are shown in FIG. 1, a particular environment may include any number of servers and any number of client computers coupled to one another.

As shown in FIG. 1, server 102 contains a communication module 110, an document control module 112, and information display policies 114. Communication module 110 provides a mechanism for server 102 to communicate with other computing devices coupled to the network (e.g., client computers 106 and 108). Document control module 112 handles the distribution of documents from server 102 to other computing devices via network 104. For example, document control module 112 may access various information display policies 114 to determine which portions of a particular document may be distributed to a requesting client computer.

Server 102 also contains multiple documents (Document 1, Document 2, . . . Document N) identified by reference numbers 116, 118, and 120, respectively. A particular server 102 may contain any number of documents. These documents may contain text, images, tables, charts, and any other type of data or graphical image. As used herein, a "document" refers to any collection of alphanumeric characters, images, or data. For example, a report containing text, pictures, and tables is a document. Similarly, a photograph is a document. A document may also be one or more web pages. A particular document may contain one or more audio files that contain music, sound effects, verbal instructions, or other audio content. These audio files may be "redacted" by, for example, preventing playback of the audio file or distorting the audio file such that the associated audio content is unclear or unintelligible.

Client computer 108 contains a communication module 130, information display policies 132, an authorization module 134, and a rendering module 136. Communication module 130 allows client computer 108 to communicate with other computing devices coupled to network 104. Information display policies 132 define the types of information that can be displayed (or otherwise presented) to various users of client computer 108. Authorization module 134 determines whether a particular user of client computer 108 is authorized to view a particular document (i.e., view the complete document or a portion of the document). This determination is made by applying information display policies 132 to the information contained in the document. Rendering module 136 generates a version of a document in which the portions that the user is not authorized to view have been redacted. Although not shown in FIG. 1, client computer 106 may contain modules and policies similar to those discussed above with respect to client computer 108.

Figure 2:
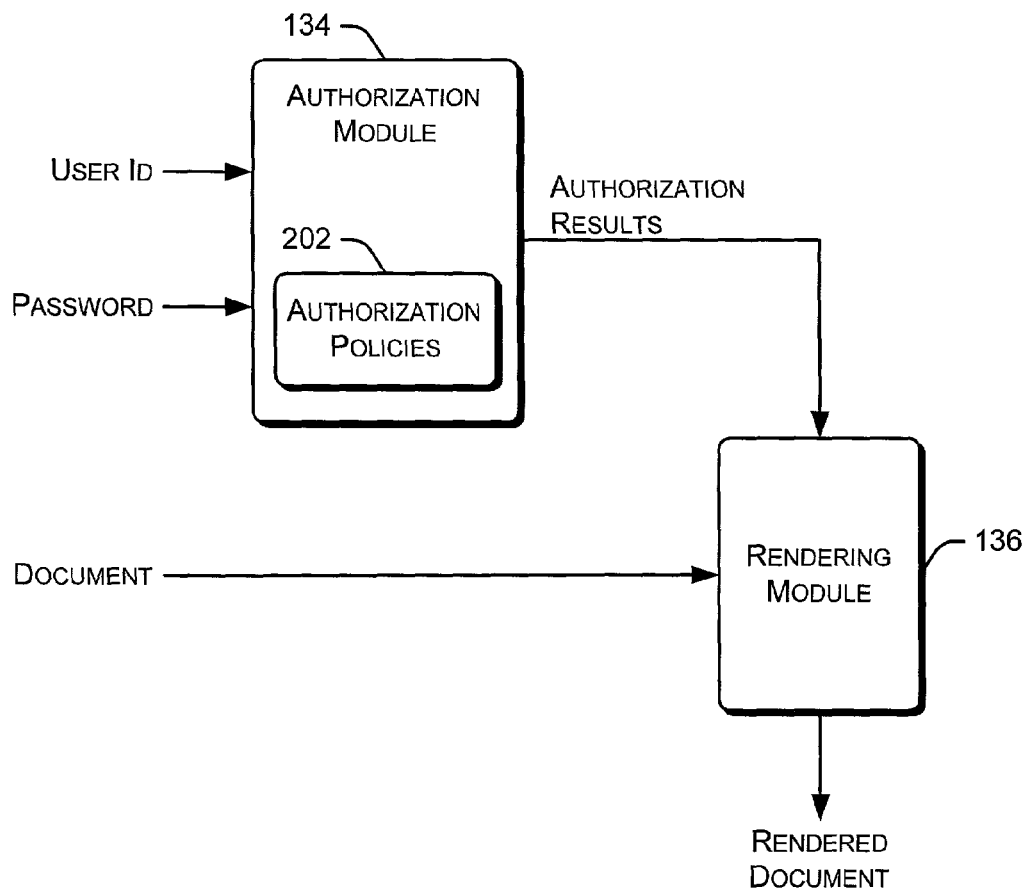
FIG. 2 is a block diagram illustrating pertinent portions of an authorization system.

FIG. 2 is a block diagram illustrating pertinent portions of an authorization system. The authorization system shown in FIG. 2 may be implemented in a server or a client computing device. Authorization module 134 includes authorization policies 202, which are used to determine whether a particular individual is authorized to view particular types of information that may be contained in a document. For example, the authorization policies 202 may define multiple levels of authorization. Each level of authorization provides access to certain types of information that may be contained in a document. Authorization module 134 also receives a user ID (or computer system ID), and a password to authenticate the user ID and determine information that the user is permitted to access.

Authorization module 134 determines the appropriate authorization results (such as an authorization level) associated with the user ID. These authorization results are provided to rendering module 136, which also receives one or more documents to which the authorization results are applied. The documents provided to rendering module 136 are typically in an electronic format (e.g., web pages, word processing documents, images, or audio files). Rendering module 136 applies the authorization results to the received documents and generates a rendered document, which may contain one or more redacted portions, depending on the authorization results and the document contents. One or more portions of a document can be redacted by deleting the information or making the entire portion a solid color, such as black or white, thereby hiding the content of the document portion. Alternatively, a portion of a document can be visually blurred such that the information is not intelligible to the viewer. As mentioned above, audio files may be deleted or distorted to prevent clear playback of the audio content.

Various procedures are available for blurring portions of a document. For example, a pixel averaging technique can be used to blur an image or other portion of a document. Using this technique, each pixel value is calculated (or recalculated) by averaging the original value of the pixel with the values of the eight surrounding pixels. Alternatively, the pixel value may be determined by averaging any number of surrounding pixels, depending on the amount of blurring desired.

In a particular embodiment, a portion of a document may be slightly blurred, such that the viewer can see the general content of the redacted portion, but cannot see the details. This approach may be used, for example, to encourage a viewer to purchase a complete (i.e., unredacted) version of the document. This embodiment is particularly useful when the redacted portion of the document is an image. If the viewer is interested in the content of the slightly blurred version of the image, the viewer may be encouraged to purchase a clear (non-blurred) version of the image.

Table 1 below illustrates an example of multiple levels of authorization and the access privileges associated with each of the multiple levels. Table 1 represents one example of authorization policies 202.

TABLE 1

| Authorization Level | Access Privileges |
|---|---|
| Public | Public Information |
| Low | Public Information and Employee Addresses |
| Medium | Public Information, Employee Addresses, and Employee Salary Information |
| High | Public Information, Employee Addresses, Employee Salary Info, and Employee Evaluations |

Table 1 illustrates four different authorization levels: Public, Low, Medium, and High. An individual having a Public Authorization Level can access public information contained in a document (i.e., non-confidential information). An individual having a Low Authorization Level can access public information in the document as well as employee addresses. An individual having a Medium Authorization Level can access public information, employee addresses, and employee salary information contained in the document. An individual with a High Authorization Level can access all information accessed by the Medium Authorization Level as well as employee evaluation information. Thus, a single document can be used by individuals at all four authorization levels instead of providing a separate version of the document for each of the four levels.

A particular document may not contain all of the information discussed above. For example, a particular document may contain public information and a portion of an employee evaluation. In this example, the Public, Low, and Medium Authorization Levels can access the public information. Individuals with a High Authorization Level can access both the public information and the employee evaluation information in the document.

Table 1 illustrates one technique for determining access privileges for different individuals. Various other techniques may also be used to define one or more authorization policies.

In another implementation, the document is a parts catalog that contains part descriptions as well as retail pricing and wholesale pricing of the described parts. In this implementation, everyone accessing the document is permitted to view the part descriptions and the retail pricing. However, the wholesale pricing information is redacted for those users (or systems) that are not able to purchase parts at wholesale prices. Only those users or systems that are permitted to purchase parts at wholesale prices are permitted to view the wholesale pricing information. This implementation allows a single document to support both retail and wholesale customers, instead of creating and maintaining a separate document for each set of customers.

The manner in which an image or other portion of a document is to be redacted may be contained in the image or document itself. For example, a particular image storage format may allocate 24 bits of data for each pixel, which leaves eight unused bits in a 32 bit system. These additional eight bits can be used to define a redacted version of the pixel (e.g., black, white, or blurred using a pixel averaging technique). In one implementation, the collection of eight bits represent a mask image that is applied to the original image to redact the original image. In another implementation, the collection of eight bits represent a second image that replaces the original image if the original image is redacted.

Redacting of portions of a document as described herein may be applied to a fixed document or a still image as well as a changing video image or a changing document (such as a changing web page, full-motion video or other dynamic document). For example, in the case of a changing image, the additional eight bits may change to identify different portions of the image to be redacted or to identify different techniques for redacting the image as the image changes. The location, size, and shape of the redacted region may change as the document changes. Thus, the additional bits of data may also define the particular region (or regions) of the document to redact at a particular time.

Figure 3:
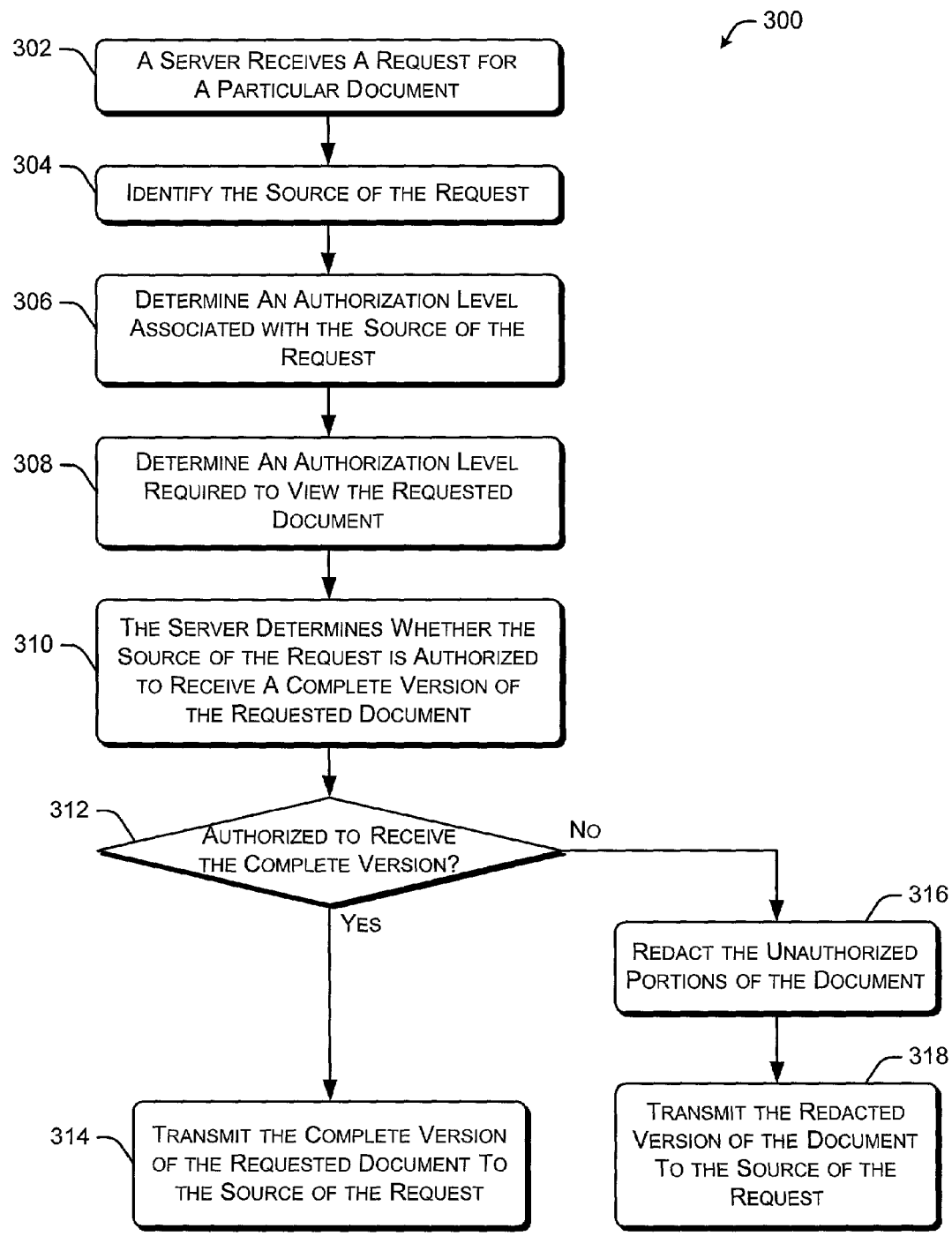
FIG. 3 is a flow diagram illustrating a procedure for distributing documents from a server to a client.

FIG. 3 is a flow diagram illustrating a procedure 300 for distributing documents from a server to a client. Initially, a server receives a request for a particular document (block 302). The procedure then identifies the source of the request (block 304). The source of the request may be identified as an individual user or identified as a computer system (e.g., a client computer system). The source of the request may identify itself in the request using a user ID or a computer ID. The procedure then determines an authorization level associated with the source of the request (block 306). This determination may be performed, for example, by an authorization module, such as authorization module 134.

The procedure 300 then determines what authorization level is required to view the requested document (block 308). As discussed above, different portions of a document may require different authorization levels to view the document portions. Next, the server determines whether the source of the request is authorized to receive a complete (i.e., unredacted) version of the requested document (block 310). If the source of the request is authorized to receive a complete version of the requested document, the server transmits the complete version of the requested document to the source of the request (block 314). If the source of the request is not authorized to receive a complete version of the requested document, the server redacts the unauthorized portions of the document (block 316) and transmits the redacted version of the document to the source of the request (block 318).

Figure 4:
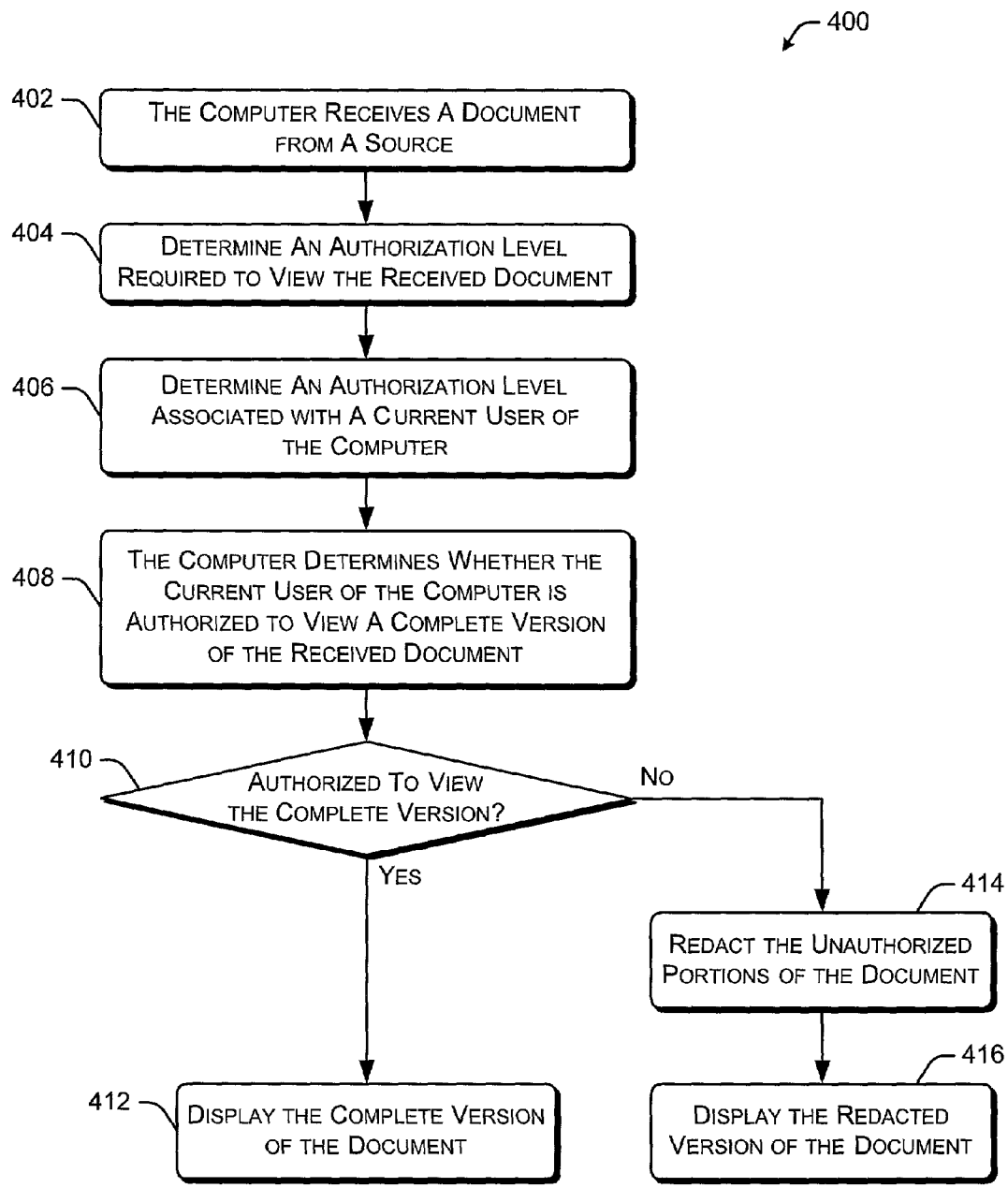
FIG. 4 is a flow diagram illustrating a procedure for receiving and displaying a document.

FIG. 4 is a flow diagram illustrating a procedure 400 for receiving and displaying a document. Initially, a computer receives a document from a source (block 402), such as a server. Depending on the authorization level of the user or computer system that received the document, portions of the received document may have been redacted by the source of the document. The procedure then determines an authorization level required to view the received document (block 404). This determination may be based on the confidentiality of the information, such as confidential corporate or employee information. Alternatively, the determination may be based on the maturity level required to view the content of the document. For example, portions of the document may contain images or other information that is appropriate for adults, but inappropriate for children. As discussed above, different portions of a document may require different authorization levels to view the document portion.

The procedure 400 then determines an authorization level associated with a current user of the computer (block 406). The current user of the computer may be identified, for example, by requiring the user to login using a user ID and password. The computer then determines whether the current user of the computer is authorized to view a complete (i.e., unredacted) version of the received document (block 408). If the current user of the computer is authorized to view the complete version of the received document, the complete version of the document is displayed on the computer (block 412). If the current user of the computer is not authorized to view the complete version of the received document, the procedure redacts the unauthorized portions of the document (block 414) and displays the redacted version of the document on the computer (block 416).

Figure 5:
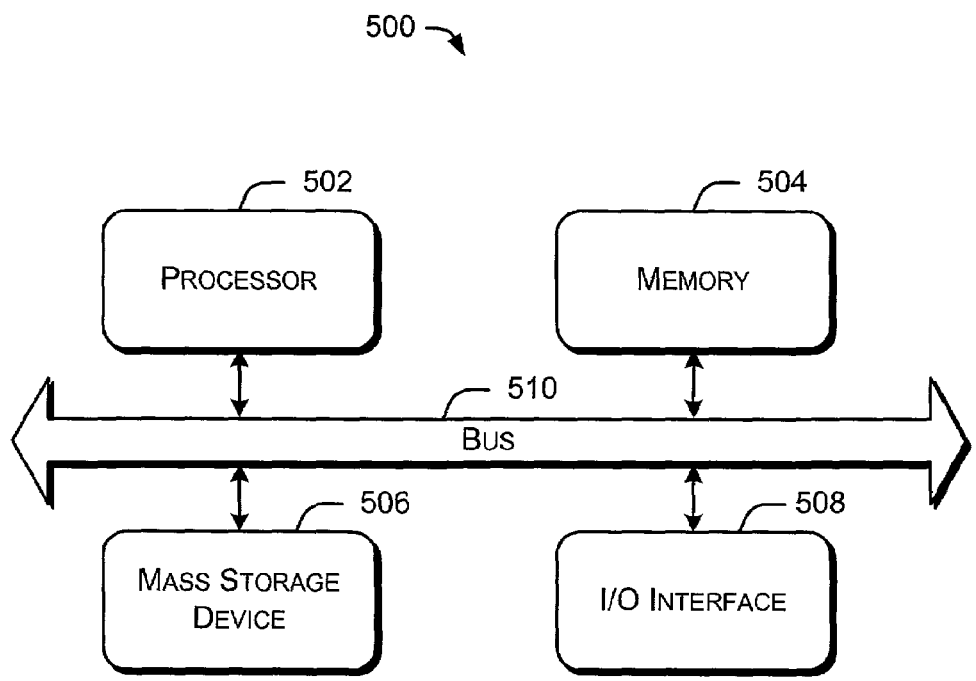
FIG. 5 is a block diagram of a computer system that can be utilized in accordance with one or more embodiments described herein.

FIG. 5 is a block diagram of a computer system 500 that can be utilized in accordance with one or more embodiments described herein. Computer system 500 can be, for example, a server such as server 102 and/or a client computer such as client computers 106 or 108 of FIG. 1. Computer system 500 represents a wide variety of computing devices, such as desktop computers, portable computers, dedicated server computers, multi-processor computing devices, cellular telephones, PDAs, handheld or pen-based computers, microcontroller-based electronic devices, gaming consoles, and so forth.

Computer system 500 includes one or more processors 502, memory 504, a mass storage device 506, and an input/output (I/O) interface 508, all coupled to a bus 510. Bus 510 represents one or more buses in computer system 500, such as a system bus, processor bus, accelerated graphics port (AGP), peripheral component interconnect (PCI), and so forth. The bus architecture can vary by computing device as well as by manufacturer. I/O interface 508 is a conventional interface allowing components of computer system 500 (e.g., processor(s) 502) to communicate with other computing devices, such as via network 104 of FIG. 1. I/O interface 508 may be, for example, a modem, a network interface card (NIC), and so forth.

Memory 504 represents volatile and/or nonvolatile memory used to store instructions and data for use by processor 502. Typically, instructions are stored on mass storage device 506 (or nonvolatile memory) and loaded into a volatile memory 504 for execution by processor(s) 502. Additional memory components may also be involved, such as cache memories internal or external to processor 502. Various embodiments can be implemented, at different times, in any of a variety of computer readable media that is part of, or readable by, computer system 500. For example, such computer readable media may be mass storage device 506, memory 504 or a cache memory, a removable disk (not shown) that is accessible by processor 502, or another controller of computer system 500 (such as a magnetic disk or optical disk), and so forth.

Computer system 500 is exemplary only. It is to be appreciated that additional components (not shown) can be included in computer system 500 and some components illustrated in computer system 500 need not be included. For example, a display adapter, additional processors or storage devices, additional I/O interfaces, and so forth may be included in computer system 500, or mass storage device 506 may not be included.

The discussions herein refer to software components and modules that can be executed by a computing device. It is to be appreciated, however, that the components and processes described herein can be implemented in software, firmware, hardware, or a combination thereof. By way of example, a programmable logic device (PLD) or an application specific integrated circuit (ASIC) could be configured or designed to implement various components and/or processes discussed herein.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   receiving with a server a request from a remote computer for a document;
   identifying on the server a source of the request;
   determining on the server an authorization level associated with the source of the request;
   determining on the server an authorization level required to view the requested document;
   if the source of the request is authorized to view the entire requested document, transmitting the requested document from the server to the remote computer via a network; and
   if the source of the request is not authorized to view the entire requested document, redacting unauthorized portions of the requested document by visually blurring the unauthorized portions on the server and transmitting the redacted version of the requested document from the server to the remote computer via the network.

2. A method as recited in claim 1 wherein determining an authorization level required to view the requested document includes determining a plurality of required authorization levels, wherein each required authorization level is associated with a different portion of the requested document.

3. A method as recited in claim 1 wherein the requested document includes an image, and wherein the image has an associated required authorization level.

4. A method as recited in claim 1 wherein identifying a source of the request includes identifying a user ID associated with the source of the request.

5. A method as recited in claim 1 wherein determining an authorization level required to view the requested document includes determining an authorization level required to view the complete requested document.

6. A method as recited in claim 1 wherein determining an authorization level required to view the requested document includes determining an authorization level required to view at least a portion of the requested document.

7. The method of claim 1, wherein determining an authorization level associated with the source comprises determining whether a viewing fee has been paid.

8. A computer-readable media having stored thereon a plurality of instructions that, when executed by a processor, cause the processor to perform acts comprising:
   identifying with a server a source of a request for a document received from a remote computer;
   determining on the server an authorization level associated with the source of the request;
   determining on the server an authorization level required to view the entire requested document;
   if the source of the request is authorized to view the entire requested document, transmitting the requested document from the server to the remote computer via a network; and
   if the source of the request is not authorized to view the entire requested document, redacting unauthorized portions of the requested document by visually blurring the unauthorized portions on the server and transmitting the redacted version of the requested document from the server to the remote computer via the network.

9. A computer-readable media as recited in claim 8 wherein determining an authorization level required to view the requested document includes determining a plurality of required authorization levels, wherein each required authorization level is associated with a different portion of the requested document.

10. A computer-readable media as recited in claim 8 wherein identifying a source of the request includes identifying a user ID associated with the source of the request.

11. A computer-readable media as recited in claim 8, wherein determining an authorization level required to view the entire requested document comprises determining whether a viewing fee has been paid.

* * * * *